March 31, 1942.   F. L. ALBEN   2,277,835
VEHICLE DRIVE
Filed Oct. 7, 1939   4 Sheets-Sheet 1

WITNESSES:
Leon M. Garman
[signature]

INVENTOR
Frank L. Alben
BY
[signature]
ATTORNEY

March 31, 1942.                F. L. ALBEN                2,277,835
                              VEHICLE DRIVE
                          Filed Oct. 7, 1939              4 Sheets-Sheet 2

WITNESSES:                                                INVENTOR
                                                        Frank L. Alben.
                                                              ATTORNEY

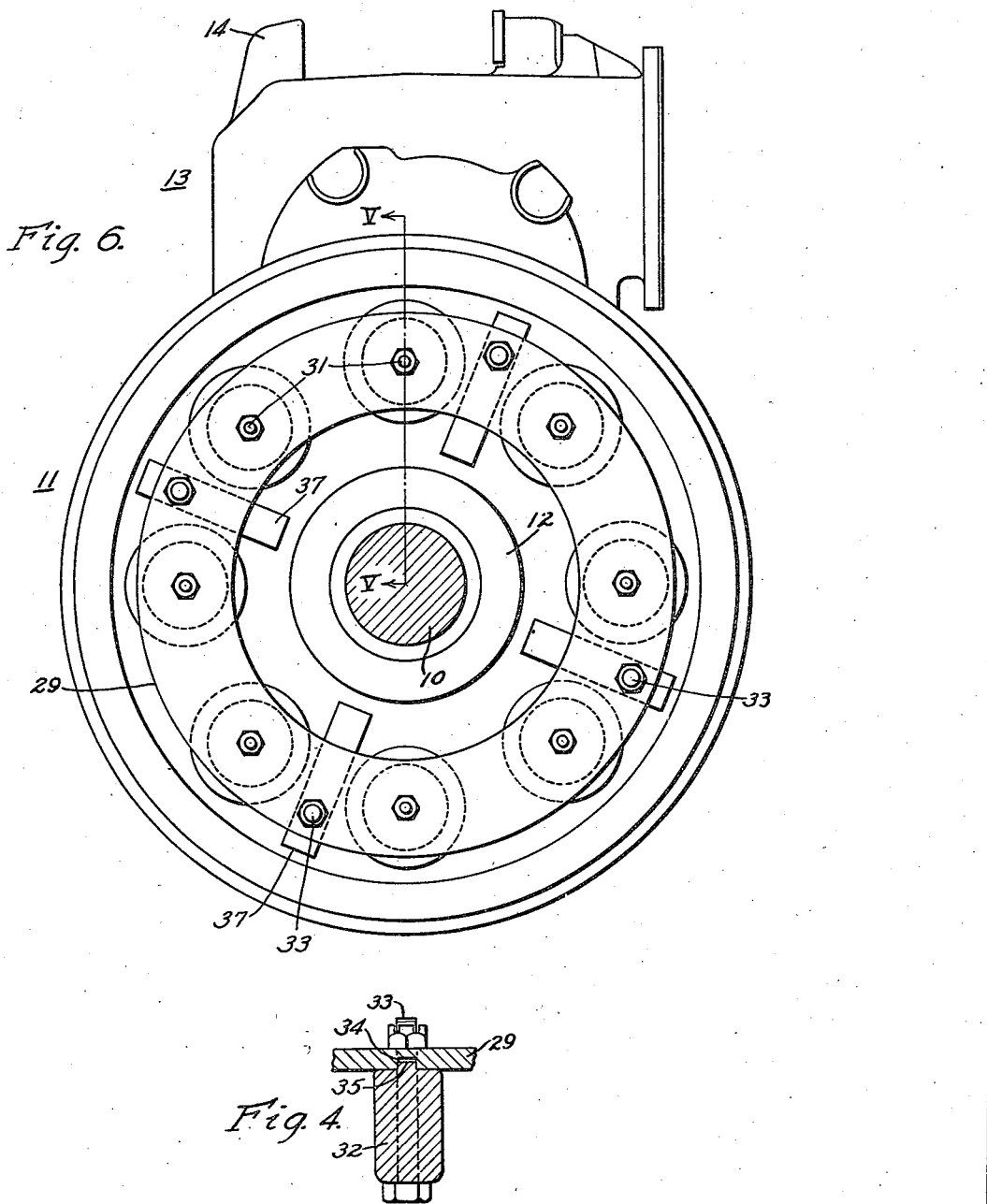

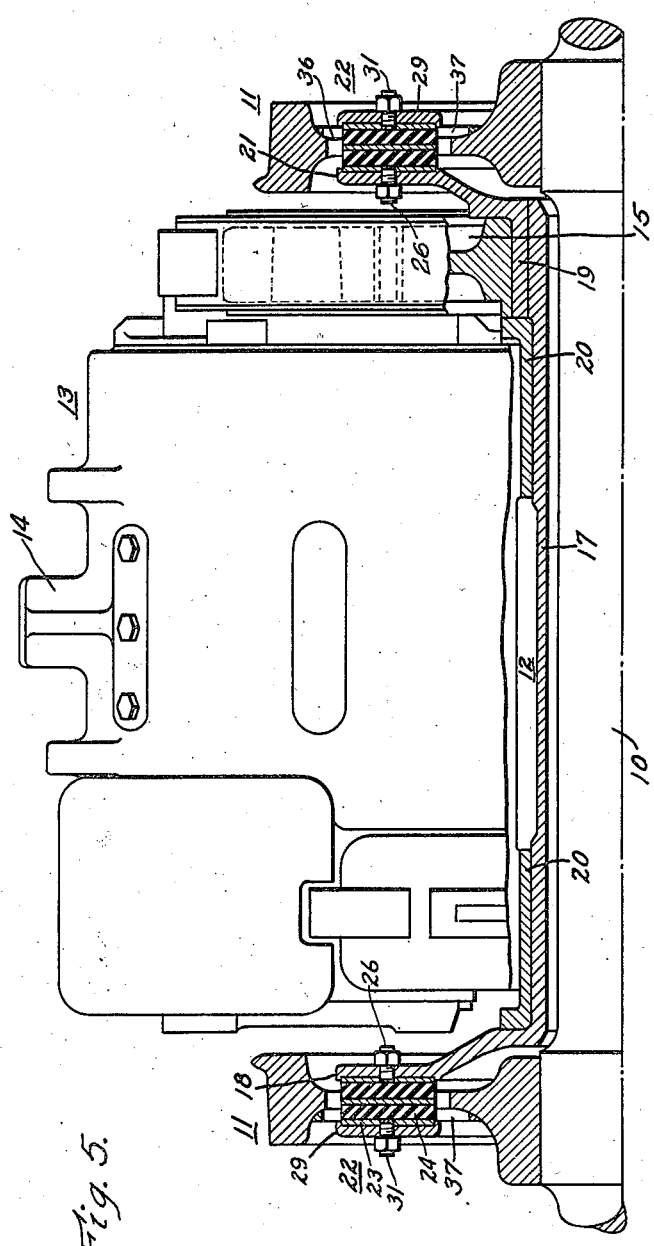

Patented Mar. 31, 1942

2,277,835

UNITED STATES PATENT OFFICE 2,277,835

VEHICLE DRIVE

Frank L. Alben, Pittsburgh, Pa., assignor to Westinghouse Electric & Manufacturing Company, East Pittsburgh, Pa., a corporation of Pennsylvania Application October 7, 1939, Serial No. 298,442

5 Claims. (Cl. 105—131)

My invention relates, generally, to vehicle drives and, more particularly, to flexible drives for electrically-propelled vehicles.

As a result of tests made on certain railroads in this country, it has been found that the vertical accelerations of the dead weights, such as axles, wheels, boxes, and motors, at high speeds impose destructive forces on the track and the mechanical, as well as the electrical, equipment on the vehicle, resulting in high maintenance costs. With the adoption of high speed streamlined trains which are driven by axle-suspended motors, it is desirable to reduce the dead weight mass as much as possible in order to eliminate the foregoing undesirable features which are inherent in motive power equipment having high dead weight mass.

An object of my invention, generally stated, is to provide a vehicle drive which shall be simple and efficient in operation and which may be economically manufactured and installed.

A more specific object of my invention is to reduce the dead weight in a vehicle driving equipment.

Another object of my invention is to provide for resiliently mounting an electric motor or a driving unit on a vehicle axle.

A further object of my invention is to provide a flexible drive for a vehicle in which the driving torque is resiliently transmitted to the driving wheels.

Another object of my invention is to provide a combined resilient mounting and drive for an axle-suspended motor or driving unit.

Other objects of my invention will be explained fully hereinafter or will be apparent to those skilled in the art.

In practicing my invention the motor or driving unit and driving gear are supported on a quill which surrounds the axle of a vehicle. The gear is secured to the quill which rotates in bearings in the motor housing. The quill together with the motor or driving unit and the gear are supported by rubber sandwiches attached to the wheels by suitable steel rings, thereby resiliently supporting the motor or driving unit and also providing a flexible drive for transmitting the torque.

For a fuller understanding of the nature and objects of my invention, reference may be had to the following detailed description taken in conjunction with the accompanying drawings, in which:

Fig. 4 is also an enlarged sectional view, taken along the line IV—IV of Fig. 3;

Fig. 5 is a view, partially in plan and partially in section, of a modification of the structure shown in Fig. 1, the section being taken along the line V—V of Fig. 6, and Fig. 6 is a view, in end elevation, of the modified structure of Fig. 5.

Figure 1:
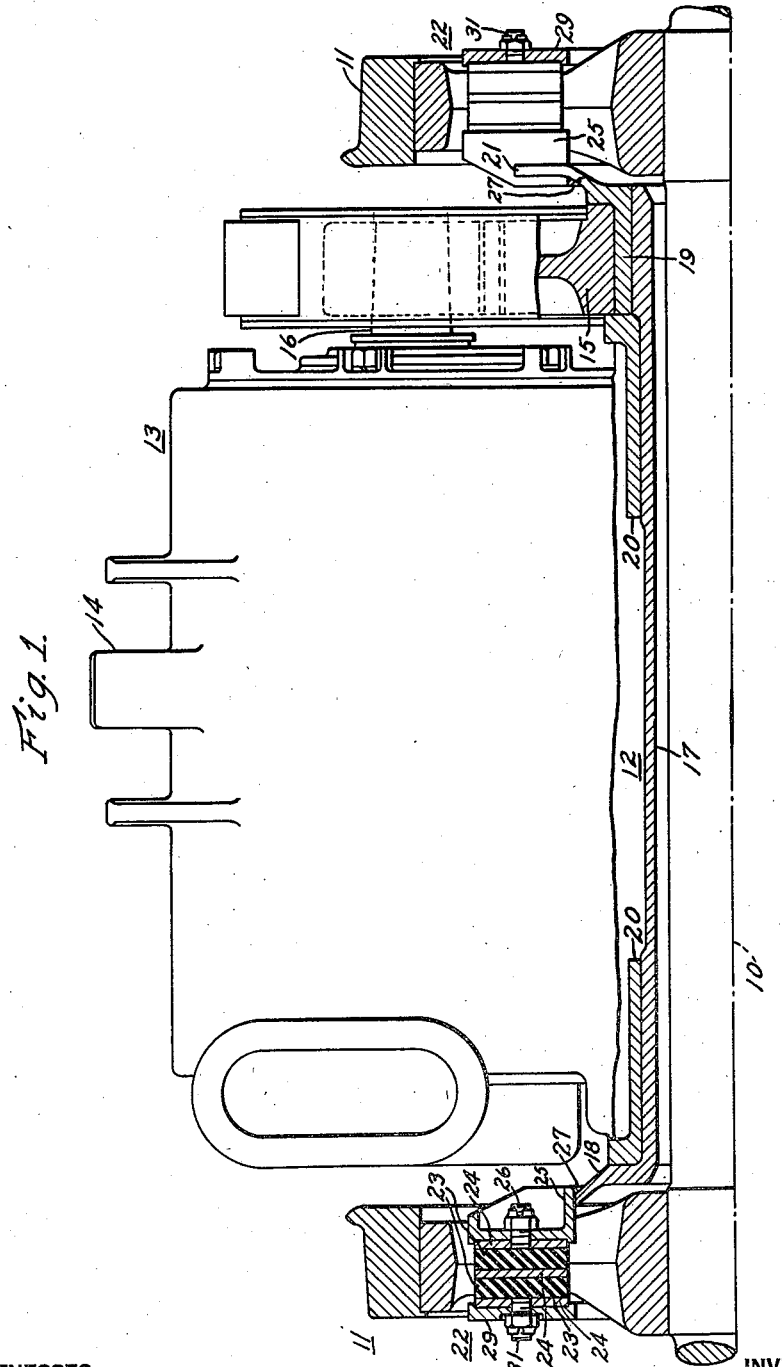
Figure 1 is a view, partially in plan and partially in section, of a portion of a vehicle drive embodying my invention, the section being taken along the line I—I of Fig. 2.

Referring now to the drawings, and particularly to Fig. 1, the structure shown therein comprises a wheel axle 10 on which wheels 11 are secured in the usual manner, a quill 12 surrounding the axle 10, an electric motor 13, one side of which is mounted on the quill 12 and the other side of which may be suspended from a vehicle truck frame (not shown) by means of a nose 14 provided on the side of the motor opposite the quill 12, and a gear 15 which may be secured to the quill 12 in the usual manner and is driven by a motor pinion disposed on the armature shaft 16 of the motor 13. The quill 12 is rotatably mounted in bearings 20, disposed in the motor housing in the usual manner for axle mounted motors.

As shown in Fig. 1, the quill 12 comprises a cylindrical portion 17 which surrounds the axle 10 and is provided with an annular flange 18 on the left-hand end. A sleeve 19 having an annular flange 21, similar to the flange 18, is pressed on the right-hand end of the cylindrical portion 17 of the quill. The driving gear 15 may be pressed on the sleeve 19 as shown, thereby transmitting the motor torque through the pinion 16 and the gear 15 to the quill 12 from which it is transmitted to the wheels 11 in a manner which will be more fully described hereinafter.

In order that the motor 13, the gear 15, and the quill 12 shall be resiliently mounted to reduce the dead weight of the vehicle equipment, the quill 12 is connected to the wheels 11 by means of a plurality of resilient members 22 which are disposed within the wheels 11. As shown, each one of the resilient members 22 comprises rubber discs 23 sandwiched between metal discs 24 and vulcanized thereto. In the particular embodiment of the invention illustrated, two layers of rubber with a metal disc 24 interposed between them are disposed between two outer metal discs 24. However, it will be understood that other arrangements of the layers of rubber and metal may be utilized if desired. It will also be understood that the invention is not necessarily limited to the use of rubber for the resilient material, as other resilient materials may be utilized, if desired.

Figure 2:
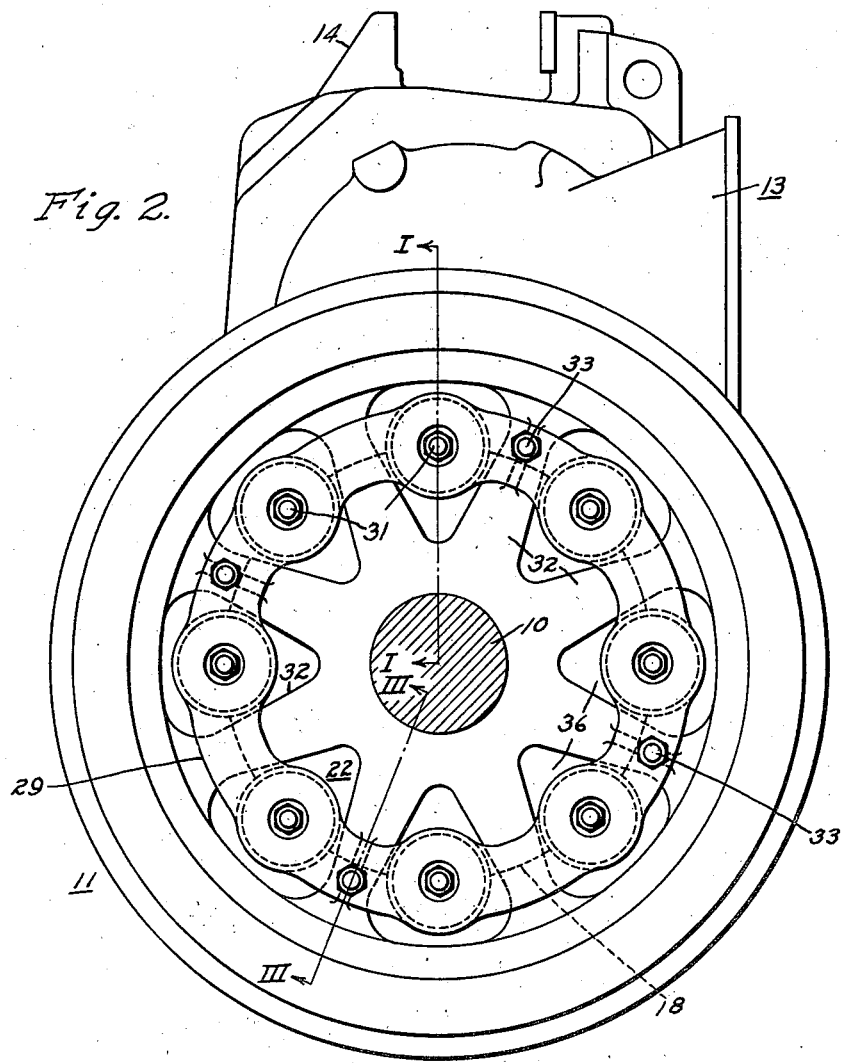
Fig. 2 is a view, in end elevation, of the vehicle drive.

One end of each of the resilient members 22 is secured to a bracket 25 by means of a bolt 26, one end of which is secured to one of the outer metal discs 24. The brackets 25 are secured to the annular flange 18, or the flange 21, by welding, as at 27, or in any other suitable manner. The other end of each one of the resilient members 22 is secured to a ring 29 by means of a bolt 31 which is secured to the other one of the outer discs 24 in a manner similar to the bolt 26. As shown in Fig. 2, the resilient members 22 are disposed between spokes 32 of a wheel 11, one resilient member being provided between each pair of spokes. However, the number of resilient members required depends upon the axle rail load and the motor weight.

Figure 3:
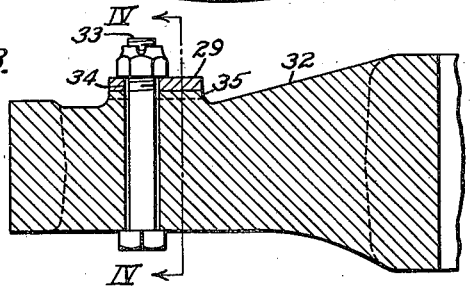
Fig. 3 is an enlarged sectional view, taken along the line III—III of Fig. 2.

As shown in Figs. 3 and 4, the ring 29 is secured to the spokes 32 by means of bolts 33. If desired, the ring 29 may be provided with notches 34 into which corresponding flanges 35 on the spokes 32 are seated in order to fasten the ring 29 to the spokes 32 more securely. As illustrated in Fig. 2, the ring 29 is secured to the wheel 11 at four points, it being unnecessary to provide bolts 33 in every spoke of the wheel.

In this manner the structure herein described not only provides for resiliently supporting the motor, thereby reducing the dead weight mass, but also provides a flexible drive for transmitting the torque to the wheels, which results in less impact forces on the gearing caused by inertia when accelerating or retarding, since the torque is transmitted to the wheels through the resilient members 22.

Furthermore, the resilient members 22 are so disposed in the drive that the rubber is always in shear and no motion takes place between the sandwiches and the wheel to cause wear. In case it is necessary to replace any of the rubber sandwiches, this may be readily accomplished by first removing the ring 29 by loosening the bolts 31 and 33, and then removing the desired resilient members by loosening the bolts 26, which permits the resilient members to be removed from the outside of the wheels 11.

The modification of the invention illustrated in Figs. 5 and 6 is similar in structure and function to the one described hereinbefore with the exception that the wheels 11 are of the disc type instead of having spokes. Also the brackets 25 are omitted, the resilient members 22 being connected directly to the flange 18 or the flange 21 on the quill 12. As shown, the wheels 11 are provided with a plurality of openings 36 in which the resilient members 22 are disposed. Each one of the rings 29 is secured to a wheel 11 at a plurality of points by means of the bolts 33. As shown in Figs. 5 and 6, spacing bars 37 are provided between the rings 29 and the wheels 11 where the rings are secured to a wheel by the bolts 33.

As explained hereinbefore, the members 22 function to resiliently support the motor 13, the gear 15 and the quill 12 as well as to flexibly transmit the torque to the wheels in the same manner as previously described. The modification of the invention illustrated in Figs. 5 and 6 is particularly suitable for use with wheels of a smaller diameter than those shown in Figs. 1 and 2. Otherwise, the structure shown in Figs. 5 and 6 is essentially the same as that previously described, and it is believed to be unnecessary to describe the present structure in more detail.

From the foregoing description, it is evident that I have provided a vehicle drive and motor support which is suitable for high speed operation since the dead or unsprung weight of the motive equipment is materially reduced and the driving torque is flexibly transmitted. Furthermore, the structure herein described is simple in manufacture and operation and low in maintenance costs, thereby having numerous advantages over drives previously manufactured.

It is also evident that my invention is not limited in its application to vehicle drives having electric motors, but may be utilized with other driving units in which the power is transmitted mechanically or by fluid pressure instead of electrically.

Since numerous changes may be made in the above described constructions and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a vehicle drive mechanism, in combination, a wheel axle, wheels on the axle, a quill surrounding the axle, a motor mounted on the quill, said quill being rotatably disposed in the motor housing, a gear secured to the quill, and means for resiliently connecting the quill to the wheels at a plurality of points, each of said connecting means comprising a rubber disc disposed between and attached to a pair of metal discs one of which is removably secured to the quill and the other of which is removably secured to the wheel, said rubber discs being in shear under all conditions of load.

2. In a vehicle drive mechanism, in combination, a wheel axle, wheels on the axle, a quill surrounding the axle, a motor mounted on the quill, said quill being rotatably disposed in the motor housing, a gear secured to the quill, and means for resiliently connecting the quill to the wheels at a plurality of points, said connecting means comprising a ring secured to the wheel and a plurality of resilient members, each resilient member comprising at least one disc of resilient material sandwiched between and attached to a pair of metal discs, one of said discs being removably secured to the quill and the other removably secured to the ring.

3. A vehicle drive comprising a wheel axle, a quill shaft surrounding the wheel axle, and resilient coupling members for transmitting torque between the quill shaft and the wheel axle, each of said coupling members comprising a pair of metal discs with at least one rubber disc sandwiched therebetween and having one metal disc rigidly secured to the quill shaft and the other metal disc rigidly secured to a wheel of the wheel axle, said rubber discs of the resilient coupling members being in shear under all conditions of load.

4. A vehicle drive comprising a wheel axle, a quill shaft surrounding the wheel axle, said quill shaft having an annular flange at the end thereof, and a plurality of resilient coupling members for transmitting torque between the quill shaft and the wheel axle, each of said coupling members comprising a plurality of rubber discs sandwiched between and attached to a plurality of non-resilient discs and one of said non-resilient discs being rigidly secured to said annular flange and another of said non-resilient discs being rigidly secured to a wheel of the wheel axle, said resilient coupling members being in shear under all conditions of load.

5. A vehicle drive comprising a wheel axle, a quill shaft surrounding the wheel axle, couplings for transmitting torque between the quill shaft and the wheel axle, each of said couplings comprising at least one rubber pad disposed between a pair of metal end plates and vulcanized thereto, and means for rigidly securing one end plate of each coupling to the quill shaft and the other end plate to a wheel of the wheel axle, whereby the rubber is in shear under all conditions of load.

FRANK L. ALBEN.